(12) United States Patent
Cherchi et al.

(10) Patent No.: US 9,065,097 B2
(45) Date of Patent: Jun. 23, 2015

(54) BACK-UP FUEL CELL ELECTRIC GENERATOR COMPRISING A COMPACT MANIFOLD BODY, AND METHODS OF MANAGING THE OPERATION THEREOF

(75) Inventors: Pierpaolo Cherchi, Turin (IT); Luca Mercante, Collegno (IT); Andrea Musso, Trento (IT); Dario Ceffa, Biella (IT); Luisa Borello, Turin (IT); Giuseppe Gianolio, Cellarengo (IT)

(73) Assignee: ELECTRO POWER SYSTEMS S.P.A., Moncalieri (Torino) (IT)

( * ) Notice: Subject to any disclaimer, the term of this patent is extended or adjusted under 35 U.S.C. 154(b) by 843 days.

(21) Appl. No.: 13/148,808

(22) PCT Filed: Feb. 11, 2010

(86) PCT No.: PCT/EP2010/051749
§ 371 (c)(1),
(2), (4) Date: Feb. 9, 2012

(87) PCT Pub. No.: WO2010/092133
PCT Pub. Date: Aug. 19, 2010

(65) Prior Publication Data
US 2012/0135326 A1      May 31, 2012

(30) Foreign Application Priority Data
Feb. 12, 2009   (EP) .................................... 09152671

(51) Int. Cl.
*H01M 8/24*     (2006.01)
*H01M 8/04*     (2006.01)

(52) U.S. Cl.
CPC ...... *H01M 8/04298* (2013.01); *H01M 8/04097* (2013.01); *H01M 8/04141* (2013.01);
(Continued)

(58) Field of Classification Search
CPC .................... H01M 8/04097; H01M 8/04141; H01M 8/0432; H01M 8/04432

USPC .................................. 429/729, 458, 432, 429
See application file for complete search history.

(56) References Cited

U.S. PATENT DOCUMENTS

| | | | | |
|---|---|---|---|---|
| 6,541,148 | B1 * | 4/2003 | Walsh et al. | 429/434 |
| 6,875,535 | B2 * | 4/2005 | Ye et al. | 429/437 |
| 2010/0266921 | A1 * | 10/2010 | Maier et al. | 429/432 |

FOREIGN PATENT DOCUMENTS

WO    WO 2008/087542         7/2008
WO    WO 2008087542 A1 *    7/2008

OTHER PUBLICATIONS

International Search Report and Written Opinion from International Application No. PCT/EP2010/051749 dated Aug. 24, 2010.

*Primary Examiner* — Jonathan Jelsma
*Assistant Examiner* — Rashid Alam
(74) *Attorney, Agent, or Firm* — R. Ruschena Patent Agent, LLC (57) ABSTRACT

A fuel cell electric generator designed for back-up in the absence of network electricity supply. The generator comprises a fuel cell stack, means for supplying the stack with a first and a second reagent flow comprising, in turn, pressure reducing means, and a manifold body to communicate with the stack said first and second reagent flows and at least a flow of coolant fluid via a respective coolant loop. The manifold body comprises inside chambers for the mixing of said reagent flows with corresponding re-circulated product flows and a coolant fluid expansion chamber within which said pressure reducing means of said first and second reagent flows are positioned at least partially drowned by said coolant. Method for the start-up and shut-down of the generator, and a method for detecting the flooding of a fuel cell and a method for detecting the presence of gas leakages in the generator are also disclosed.

3 Claims, 10 Drawing Sheets

(52) U.S. Cl.
CPC ........ *H01M8/0432* (2013.01); *H01M 8/04432* (2013.01); *H01M 8/04544* (2013.01); *H01M 8/04552* (2013.01); *H01M 8/04664* (2013.01); *H01M 8/04761* (2013.01); *H01M 8/04768* (2013.01); *H01M 8/04925* (2013.01); *H01M 8/04955* (2013.01); *H01M 8/2415* (2013.01); *Y02E 60/50* (2013.01)

BACK-UP FUEL CELL ELECTRIC GENERATOR COMPRISING A COMPACT MANIFOLD BODY, AND METHODS OF MANAGING THE OPERATION THEREOF

CROSS-REFERENCE TO RELATED APPLICATIONS

This application is a U.S. Nationalization of PCT International Application No. PCT/EP2010/051749, filed Feb. 11, 2010, entitled "BACK-UP FUEL CELL ELECTRIC GENERATOR COMPRISING A COMPACT MANIFOLD BODY, METHODS OF MANAGING THE OPERATION THEREOF," which claims priority to European Patent Application No. 09152671.5, filed Feb. 12, 2009, the entireties of both of the foregoing applications are incorporated herein by reference.

TECHNICAL FIELD

Embodiments of the present invention relate to a fuel cell electric generator specifically designed for back-up in the absence of network electricity supply, wherein a plurality of fuel cells are piled into a stack to generate electricity by being supplied with a combustible gas and an oxidising gas, on a fuel electrode (anode) and an oxidation electrode (cathode), respectively.

In particular, embodiments of the invention relate to a fuel cell electric generator comprising an electrochemical conversion module (ECM) including fuel cells of the proton exchange membrane (PEM) type and a manifold body connecting all incoming and outgoing fluid flows.

BACKGROUND ART

Fuel cells represent one of the most technologically promising solutions for the use of hydrogen as an energy source. They are devices which can, by taking advantage of an electrochemical reaction, convert chemical energy into electric power.

In a single PEM cell there take place simultaneously two half-cell reactions, at the anode and at the cathode respectively. Anode and cathode of a PEM fuel cell are separated by an electrolyte, typically consisting of a membrane of a sulphonated polymer capable of conducting protons, whose opposite sides are coated with a layer of a suitable catalytic mixture (e.g. Pt-based).

The electrolyte is generally saturated with an ionic transportation fluid (e.g. water) so that hydrogen ions can travel thereacross from anode to cathode.

The overall reaction taking place in a fuel cell is:

(1)

which is accompanied by the development of heat and electric energy and which results from the sum of two half-cell reactions occurring, respectively, at the anode:

(2)

and at the cathode:

(3)

At the anode, then, hydrogen is supplied which diffuses within the catalytic layer and dissociates into hydrogen ions and electrons, which, the membrane being impermeable to them, travel across an external electric circuit towards the cathode, generating an electric current and the corresponding potential difference. At the cathode, a gaseous mixture containing oxygen is supplied that reacts with the hydrogen ions which have travelled across the electrolyte and the electrons coming from the external electric circuit.

It is necessary that the reacting gases be humidified because it is thanks to the water molecules that the passage of protons across the polymeric membrane occurs: too low a degree of humidification leads to a reduced passage of protons from the anode compartment to the cathode compartment with a consequent worsening of the fuel cell performance, whereas too high a degree of humidification may cause the occlusion of the catalytic sites with a consequent deterioration of the fuel cell performance.

Since a well defined voltage is associated with reaction (1), in order to achieve higher voltages, a plurality of elements are generally connected in series to form a stack.

In addition to the stack, a fuel cell electric generator designed for back-up in the absence of network electricity supply comprises a hydraulic circuit (pump, piping, dissipators, etc.), gaseous currents feed and discharge circuits (hydrogen feed piping, oxygen feed piping, etc.), a control system (control unit, temperature, flow and pressure gauges, actuators, etc.). The ensemble of all the above elements constituting the remaining part of the fuel cell generator, reference is made, here and in the following, as BoP (i.e. "Balance of Plant").

Figure 1:
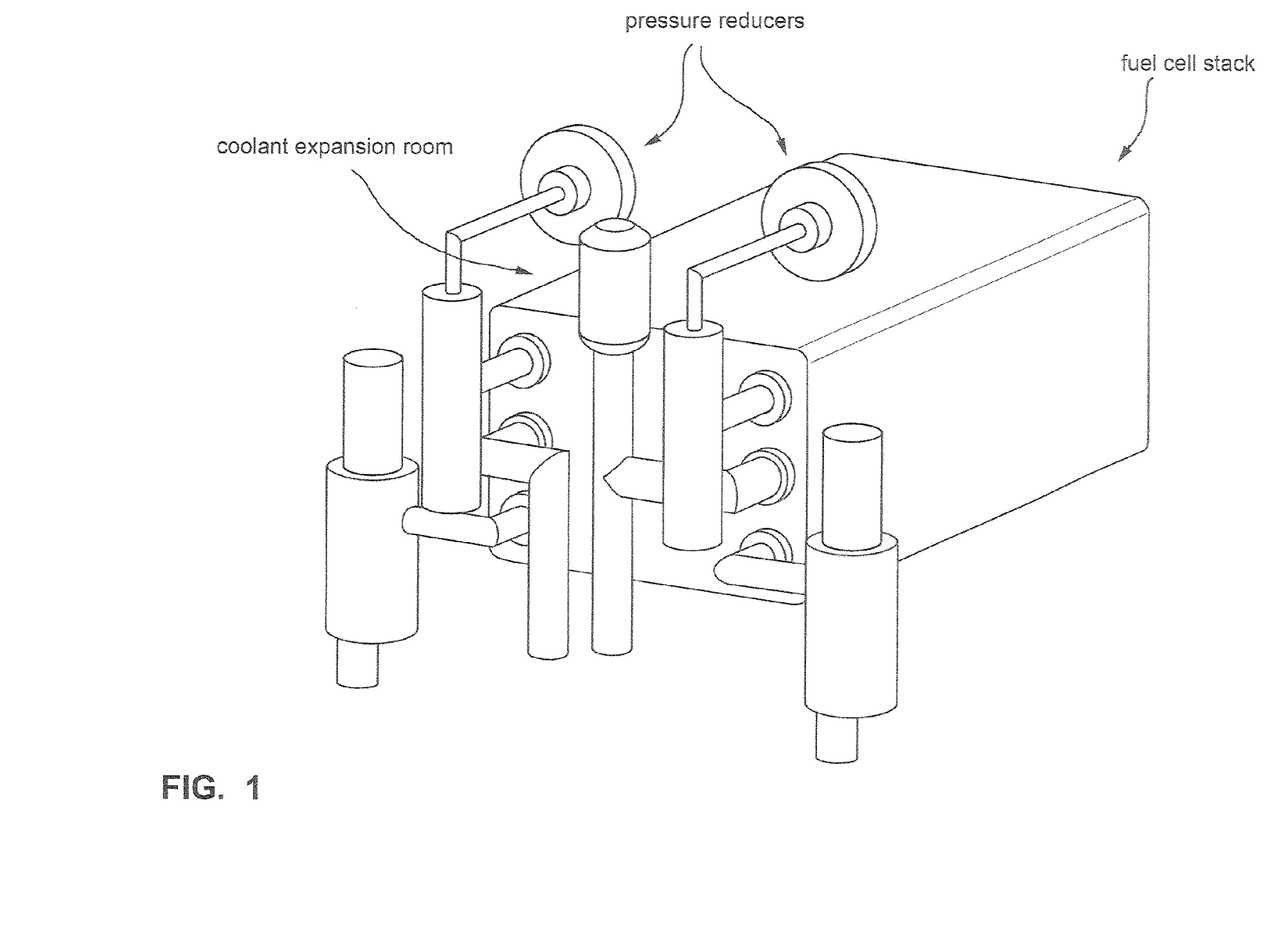
FIG. 1 illustrates a simplified perspective view of the ensemble of piping and conduits for incoming and outgoing fluids connected to the stack of a known fuel cell electric generator.

The ensemble of all the elements forming hydraulic connections between the stack passageways and other major elements of the fuel cell electric generator (e.g. the sources of reagents) generally occupy a significant space and contribute largely to the overall weight of the system. Further, the time needed for their assembling represents a significant part of the time needed to assemble the whole system. In turn, this assembly time directly affects the overall cost of the fuel cell electric generator. FIG. 1 illustrates a view of a known fuel cell electric generator wherein the stack is connected to a plurality of conduits through which reagents are fed to the fuel cells and reaction products are split into two currents, one of which is re-circulated to the stack while the other one is ultimately expelled from the system.

Solutions are known, however (e.g. from U.S. Pat. No. 6,541,148), which partly tackle this drawback by providing the fuel cell generator with a manifold body which communicates flows with the stack and further comprises a separator, located in the manifold body itself, to collect water from at least one of the flows, thus reducing, to a certain extent, the overall bulkiness.

Further, U.S. Pat. No. 6,875,535 teaches providing such a manifold with a plurality of ports and fluid passages adapted to accommodate monitoring devices to monitor fluid condition.

Such an arrangement including a manifold body may be particularly suitable for systems wherein the humidity of the reagent flows fed to the fuel cells is maintained within a desired range of values compatible with the proper operation of the generator by circulating back to the stack a predetermined portion of the exhaust anode and cathode flows. In this case, the manifold body may comprise mixing rooms in which dry fresh reagent flows are mixed with re-circulated exhaust flows carrying part of the water produced by the electrochemical reaction occurring in the fuel cells.

However, in this arrangement, humidity regulation and control is complicated by a number of factors.

Firstly, fresh reagents fed to the anode and cathode compartments undergo expansion prior to reaching their respective mixing rooms in the manifold. As a consequence, their temperature decreases, very often dropping below room temperature. As a result, when these dry and cold flows are mixed with the humid re-circulated exhaust flows in the manifold body mixing rooms, their low temperature may cause excessive condensation of the water carried by the exhaust flows, thus undesirably reducing the resulting humidity of the flow leaving the manifold body to enter the stack, which may thus be too dry to ensure fuel cell humidification degrees compatible with the correct operation of the stack. External humidification means are therefore needed, which disadvantageously increase the complexity of the BoP and affect the time needed for the installation and routine maintenance thereof. Further, the higher the number of variables, the more complex the control system supervising the operation of the electric generator, which is disadvantageous both in terms of increased costs and reduced reliability.

Secondly, the fuel cell stack is not only part of the hydraulic circuit delivering the gaseous reagents thereto and the exhaust flows to respective recirculation loops and drainers of the anode and cathode compartments, but it is integrated within a second hydraulic circuit wherein a coolant fluid flows to remove the heat generated in the stack by the electrochemical reaction and then yields it to a flow of yet a further cooling fluid, or to cooling means such as radiators and the like, or to a combination thereof.

In this respect, the thermal flows involving the stack and the coolant need to be thoroughly controlled and monitored. Because the coolant fluid is in direct contact with the stack elements, in fact, an uncontrolled increase in its pressure thereof may damage the fuel cells at a structural level. As a consequence, the coolant fluid pressure has generally to be maintained below a predetermined safety value, especially when, upon removal of heat from the stack, its temperature is expected to rise.

To this end, a further expansion vessel for the coolant needs to be provided. Disadvantageously, such a solution renders the system structure more cumbersome and further complicates the already delicate thermal integration balance. This, in turn, has repercussions, as described above, also on the humidification of the flows fed to the stack.

As can be immediately inferred from what described thus far, the known embodiments of back-up electric generation systems are relatively expensive and require accurate and careful routine maintenance to prevent their becoming unreliable. It is worth reminding that, since they are back-up systems, i.e. they are designed for intervening only occasionally, hence all moving parts (e.g. pumps, compressors, etc.) need regular and accurate controls so as to not be out of order just when an emergency occurs.

SUMMARY

One or more embodiments of the present invention provide a fuel cell electric generator specifically devised for back-up, which allows the reduction of plant and management costs as well as the increase of efficiency and reliability of the generator, while at the same time reducing the bulkiness thereof. Further, one or more embodiments of the present invention provide a fuel cell electric generator having a more efficient thermal integration between stack cooling circuit and reagent feed circuit is achieved.

One or more embodiments of the present invention provide methods for managing the operation of such a fuel cell-based back-up electric generator which increase the overall efficiency thereof during both the crucial phases of start-up and shut-down as well as under regular working conditions.

According to an embodiment of the present invention, a fuel cell electric generator includes a fuel cell stack, means for supplying the stack with a first and a second reagent flow comprising, in turn, pressure reducing means of the first and second reagent flows, respectively, and a manifold body to communicate with the stack the first and second reagent flows and at least a flow of coolant fluid via a respective coolant loop. The manifold body comprises inside chambers for the mixing of said reagent flows with corresponding re-circulated product flows, and further comprises a coolant fluid expansion chamber within which the pressure reducing means of the first and second reagent flows are positioned at least partially drowned by the coolant fluid.

Further, according to an embodiment of the present invention, there is provided a method for starting-up a fuel cell electric generator to satisfy a power request of a user (UPR), the method comprising:
 (a) supplying the user with an auxiliary power supply (APS) and, in parallel, with a fuel cell power supply (FCP) being obtained from the fuel cells in such a manner that the sum of them is substantially equal to the user power request (UPR);
 (b) acquiring data relative to overall stack voltage ($V_S$) and individual cell voltage ($V_{SC}$) of each single cell in the stack;
 (c) progressively increasing the fuel cell power supply (FCP) and decreasing the auxiliary power supply (APS) such that their sum remains substantially equal to the user power request (UPR). According to an embodiment of the invention, the step (c) of increasing the fuel cell power supply (FCP) is carried out only if the acquired data are detected to be greater than respective reference values ($V_{O,S}$ and $V_{O,SC}$) stored in a memory unit; and only until the fuel cell power supply (FCP) is detected to be equal to the user power request (UPR).

Furthermore, according to yet another embodiment of the present invention, there is provided a method for shutting down a fuel cell electric generator, the method comprising
 (a) interrupting the supply of fresh reagents to the stack;
 (b) measuring the stack temperature;
 (c) cooling down the fuel cell stack; and
 (d) purging water out of the fuel cell stack. According to the invention, the steps (c) and (d) are carried out simultaneously until the stack temperature is detected to be less than a reference value stored in a memory unit.

According to yet another embodiment of the present invention, there is provided a method for detecting the flooding of a fuel cell in an electric fuel cell generator and accordingly recovering a flooded fuel cell, the method comprising:
 (a) acquiring single cell voltage data for each fuel cell in a stack of fuel cells;
 (b) calculating an average single cell voltage (ASCV) and a threshold value $TV_O$ as a predetermined percentage of said average (ASCV);
 (c) comparing the single cell voltage of a cell with said threshold value $TV_O$;
 (d) increasing the pressure within the flow conduits of fuel cells if said single cell voltage is less than said threshold value.

According to an embodiment of the invention, said step (d) is carried out by
 (e) a first step of increasing a flow of re-circulated exhaust gases towards the stack, and
 (f) a second step, carried out after said first step and by throttling the flow of re-circulated exhaust gases towards the stack in such a manner to produce a back pressure of such exhaust gases back to the stack;
 between said steps (e) and (f) said step (C) being repeated and said step (f) being carried out only when said single cell voltage is still less than said threshold value.

According to another embodiment of the invention, there is also provided a method of checking for the presence of gas leakages in a back-up fuel cell electric generator, the method comprising
(i) carrying out a leakage test procedure for a predetermined time $t_1$; and
(j) repeating said leakage test procedure for a predetermined time $t_2$ shorter than $t_1$. According to the invention, after carrying out said step (i) and before carrying out said step (j), the electric generator is shut down.

BRIEF DESCRIPTION OF THE DRAWINGS

Further characteristics and advantages of the present invention will appear from the following description of specific embodiments thereof, given in connection with the drawings of the annexed Figures, wherein.

DETAILED DESCRIPTION

Figure 3:
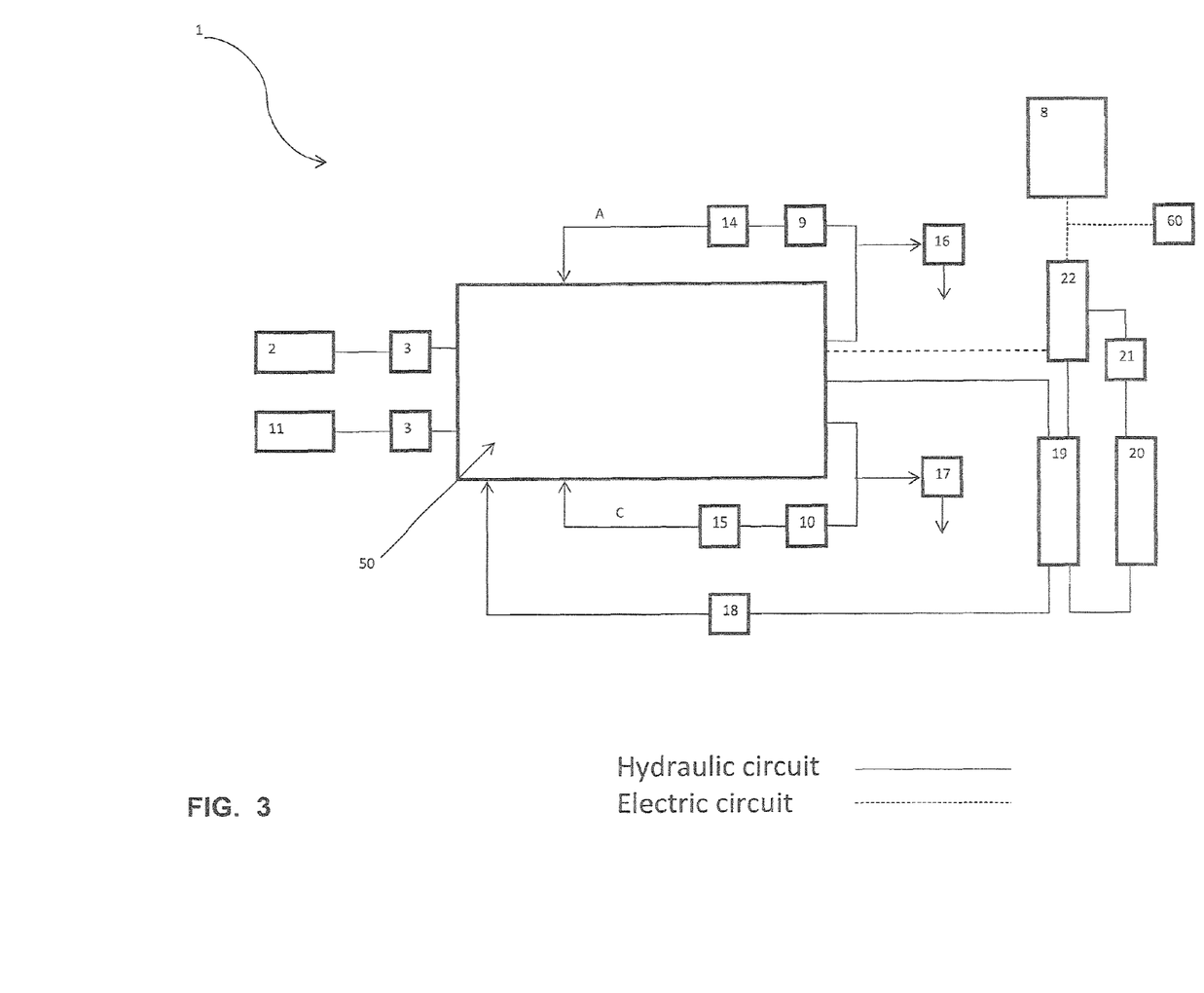
FIG. 3 is a schematic representation of a fuel cell electric generator according to an embodiment of the invention, wherein the reagent recirculation loops as well as the coolant loops are shown.
Figure 4:
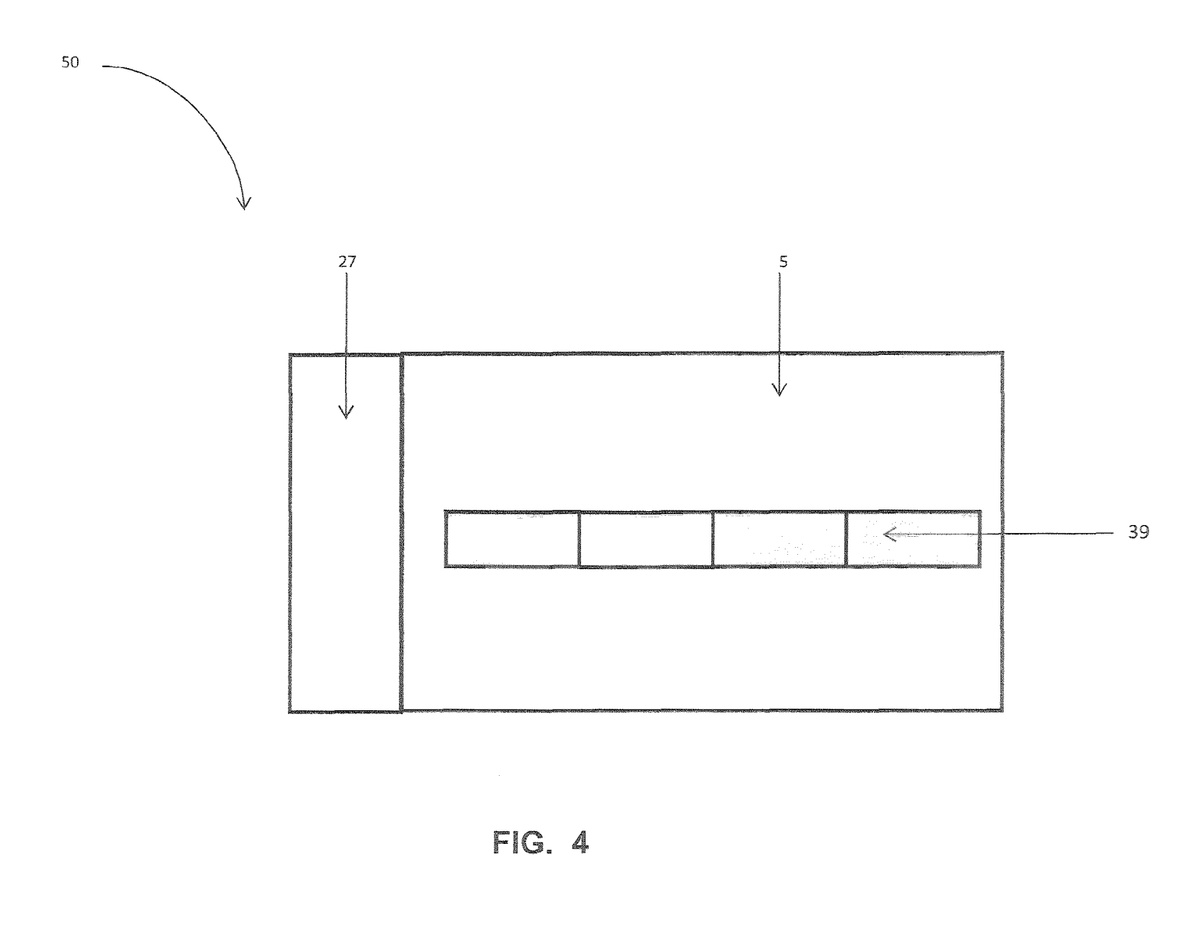
FIG. 4 illustrates a detail of the fuel cell electric generator of FIG. 3, showing how the manifold body and the stack are positioned relative to each other.

With reference to FIG. 3, there is indicated as a whole with 1 a back-up electric generator devised to supply electric energy to a user 8. The generator 1 comprises an electric conversion module 50 comprising, in turn, a plurality of PEM fuel cells piled in a stack 5, a manifold body 27 and a cell voltage monitoring (CVM) device 39 (see detail in FIG. 4). The generator is further provided with a power conditioning unit 22, which manages the supply of electric power to user 8 by alternatively acting upon switches so that user 8 receives power either from the generator 1 or from other emergency power sources (such as batteries, capacitors, etc.). Further details concerning operation modes managed by the power conditioning unit 22 will be described below.

Figure 5:
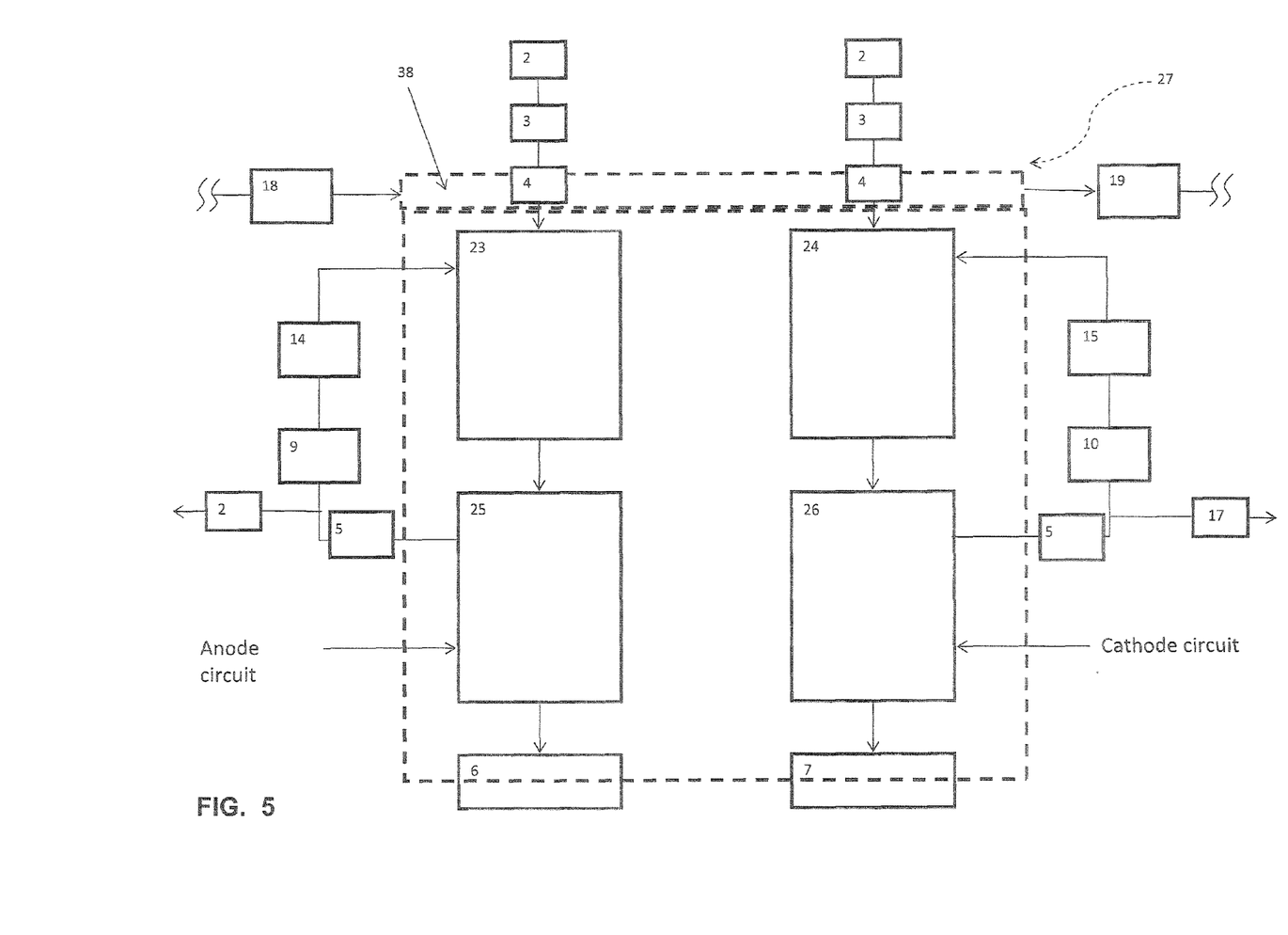
FIG. 5 is a schematic representation of a manifold body integrated with the electrochemical conversion module of a fuel cell electric generator according to an embodiment of the invention.

A flow of hydrogen in stoichometric excess is supplied to generator 1 from supply means 2, such as a cylinder of technically pure hydrogen. The supply of hydrogen is enabled by valve means 3, including valves that may be manually operated or controlled electronically by a control unit (not shown). Further, the pressure of the hydrogen flow supplied to the stack 5 is regulated by pressure reduction means 4a (see detail in FIG. 5), such as a pressure reducing valve. Flow-enabling valve means 3 and pressure reduction means 4a are arranged upstream from the stack 5 with respect to a flow direction of the flow of hydrogen supplied.

There are indicated with 11 in FIG. 3 means for supplying an oxidizing gas. For a back-up generator as the one described herein, said means for supplying an oxidising gas 11 preferably includes a pressurised source of pure oxygen, such as a pressurised cylinder. Oxygen is drawn from the means 11 and is supplied in stoichometric excess to the stack 5, the flow thereof being enabled by suitable valve means 3, similar to those described above with reference to the hydrogen circuit, consisting of valves which may be manually operated or controlled electronically by a control unit (not shown). Upstream from the stack 5 of PEM fuel cells, with respect to a flow direction of the flow of oxygen supplied, generator 1 further comprises pressure reduction means 4c (e.g. a pressure reducing valve), also similar to those used for the hydrogen flow and described above.

In the flow of hydrogen supplied to the stack there is maintained a degree of humidification suitable for the correct operation of the PEM fuel cells by humidification means, which includes a first recirculation pump 9 for a first predetermined portion of the excess flow of hydrogen towards the anode compartment of the PEM fuel cells of stack 5. The first recirculation pump 9 is set to operate so that the first portion of the excess flow of hydrogen that is re-circulated represents a predetermined part of the flow of hydrogen entering the stack 5, such as to maintain in the same entering flow of hydrogen a degree of humidification suitable for a correct operation of the fuel cells of the stack (e.g. 90-100%). This first recirculation pump 9 is arranged immediately upstream from the anode compartment of the stack 5 on anode recirculation branch A.

Similarly, in the oxygen flow supplied to the stack 5 there is maintained a degree of humidification suitable for the correct operation of the PEM fuel cells by humidification means which consist exclusively of second recirculation pump 10 for a first predetermined portion of the excess flow of oxygen towards the cathode compartment of the PEM fuel cells of stack 5. The second recirculation pump 10 is set to operate so that the first portion of the excess flow of oxygen which is re-circulated represents a predetermined part of the flow of oxygen entering the stack 5, such as to maintain in the same entering flow of oxygen a degree of humidification suitable for a correct operation of the PEM fuel cells of the stack (e.g. 90-100%). This second recirculation pump 10 is arranged immediately upstream to the cathode compartment of the stack 5 on cathode recirculation branch C.

The first portion of excess of hydrogen exiting the anode compartment which is re-circulated is at least 10% of the flow of hydrogen entering the stack 5.

Similarly, the first portion of excess of oxygen exiting the cathode compartment which is re-circulated is at least 10% of the flow of oxygen entering the stack 5.

Valve means 14 and 15 are arranged in series to pumps 9 and 10, on the anode recirculation branch A and on the cathode recirculation branch C, respectively. These valve means may be located either downstream or upstream from the recirculation pumps. Under normal operating conditions, the valve means 14 and 15 shall be open, but they are switched to a "close" position under certain anomalous or test conditions, as will be described below.

Further, purge valve means 16 and 17 are arranged in parallel, on the anode recirculation branch A and on the cathode recirculation branch C, respectively. Purge valve means 16 and 17 are adapted to purge from the anode and cathode compartments 12 and 13, respectively, the respective portions of hydrogen and oxidising gas excess fed to the stack 5 which are not re-circulated. Purge valve means 16 and 17 may include valves manually operated or electronically controlled and/or of a pipe provided with a nozzle.

Also, water drainers 6 and 7 connected to manifold body 27 are provided to remove excess water from the anode and cathode circuit, respectively. The water drainers 6 and 7 are designed such as to be connectable directly to the manifold body 27 and with a view to reducing their size with respect to arrangements known in the art.

Fresh hydrogen from source (supply means) 2 and the excess hydrogen re-circulated portion flowing in branch A are supplied to respective inlets 28 and 29 of a manifold body 27. Similarly, fresh oxidising gas from source 11 and the excess oxidizing gas re-circulated portion flowing in branch C are supplied to respective inlets 30 and 31 of manifold body 27.

Manifold body 27 comprises an anode-side mixing chamber 23 hydraulically connected to inlets 28 and 29, and a cathode-side mixing chamber 24 hydraulically connected to inlets 30 and 31.

Mixing chamber 23 has a first outlet (not shown) hydraulically connected to the anode compartment of the stack 5 and a second outlet hydraulically connected to an anode-side condensing chamber 25.

Mixing chamber 24 has a first outlet (not shown) hydraulically connected to the cathode compartment of the stack 5 and a second outlet hydraulically connected to a cathode-side condensing chamber 26.

Condensing chambers 25 and 26 are also comprised within manifold body 27 and their geometry is such that water clusters larger than 10 μm in size are removed by gravity by cyclone effect. Condensed water is subsequently removed by means of the water drainers 6 and 7, directly connected to manifold body 27. The removal of excess water achieved by cyclone effect in condensing chambers 25 and 26 improves the operation of recirculation pumps 9 and 10. A first part of the gases exiting condensing chambers 25 and 26 is re-circulated through branches A and C to the stack by means of recirculation pumps 9 and 10, while the remaining part is purged by means of purge valve means 16 and 17.

Since the electrochemical reaction taking place across the fuel cells is globally exothermic, the heat thereby generated has to be removed from stack 5 in order to maintain its working temperature within an optimum range comprised between 50 and 80° C. (preferably around 65° C.). As a consequence, the electric generator 1 is provided with a primary coolant loop 36 and a secondary coolant loop 37 (see FIG. 3).

A coolant fluid, circulated by pump 18, flows in the primary coolant loop 36 is in direct contact with the stack. Upon leaving the stack, it is first sent to heat exchanger 19, where it yields thermal energy to a coolant fluid flowing in the secondary loop 37. Pump 18 then drives it back to stack 5. The liquid coolant flowing in the secondary loop 37 collects heat from the power conditioning unit 22 and from the primary coolant fluid in heat exchanger 19. Subsequently, it is sent on to radiator 20, which may advantageously provided with a fan, where it is cooled down.

The manifold body 27 described above is also integrated with the primary coolant loop 36. To this end, the manifold body 27 advantageously comprises (see FIG. 5) a coolant fluid expansion chamber 38 to compensate for the increase in the coolant fluid pressure associated with the increase in its temperature. As a result, the coolant fluid pressure within the primary loop 36 is always maintained below 500 mbar. Preferably, the coolant pressure within the primary loop is maintained below 400 mbar. For the sake of operability, an opening is provided within the manifold body 27 for filling the primary coolant loop 36 with the coolant.

According to an embodiment of the present invention, the coolant fluid expansion chamber 38 is positioned within the manifold body 27 and purposely designed so that it hosts the above-mentioned pressure reduction means 4a,c of both the hydrogen and oxidising gas circuits.

Thus, a thermal compensation for the expansion of the fresh oxidising gas fed to the generator is provided. The sudden pressure reduction—as described in detail above—would cause the temperature of the oxidising gas to fall below room temperature and, as a consequence, it would cause too high an amount of water to condensate, thereby altering the humidity inside the stack to an undesirably low value. This is prevented by positioning the pressure reducing means 4a,c inside the coolant expansion chamber 38, so that the warm coolant fluid about to leave the manifold body pre-heats the dry reagent flows by yielding heat to the pressure reducing means 4a,c which are always at least partially drowned therein.

In other words, the design and positioning of the coolant expansion chamber 38 according to the invention enables both an improved thermal integration of the system and a reduction of the bulkiness thereof. Not only does a heat exchange advantageously occur between pressure reducing means 4a,c and the coolant fluid, thus preventing undesired condensation of the water carried by the re-circulated gases, but also the pressure reducing means are conveniently lodged within the manifold body, thus enabling a better space exploitation by reducing the overall size of electric generator 1.

Advantageously, ion-exchange resins may be provided in the coolant expansion chamber 38 to prevent increases in the coolant fluid conductivity.

The manifold body 27 may be made of a polymeric material. The manifold body itself, as a consequence, may act as a thermal insulator, thus enabling an easier control of condensation phenomena independently of environmental temperature fluctuations. Preferably, the manifold body 27 is made of moplen, whose mechanical and physical properties (e.g. high melting point) are always compatible with the operating conditions of the stack. The absence of metallic surfaces ensures that neither gaseous reagents not the coolant fluid may be contaminated by metallic particles. Further, costs are significantly reduced (even 70% with respect to metallic piping) since all the described hydraulic elements are obtained integral in one piece with one another by means of the moulding operation for obtaining the manifold body. Moreover, the presence of manifold body 27 as the connecting element of the hydraulic circuits integrated with the stack reduces dramatically (even by 80%) the time required for assembling the electric generator. The possibility of leakages is also remarkably reduced, as is the likelihood of ice formation, since condensation chambers are directly connected with liquid drainers. Further, liquid drainers have been designed so as to minimise their size: in particular, the float in the drainer has been designed so that a rather low level of water is needed in the drainer to cause the opening of the shutter.

Advantageously, a plurality of probes measuring temperature, pressure and conductibility of incoming and outgoing fluids are lodged in the manifold body 27 for control purposes. As a result, the probes are positioned in the immediate vicinity of the stack, which allows for faster and more precise measurements with respect to other arrangements previously used in the art. Also, maintenance is easier.

According to an embodiment of the invention, the fuel cell electric generator 1 further comprises a cell voltage monitoring device 39 which collects a plurality of respective voltage data of each and every fuel cell of the stack 5. The monitoring device 39, which is directly connected to stack 5, consists of a series of ADC converter modules, the number of which may be selected and adjusted depending on the number of fuel cells forming the stack. Each module may be adapted to scan from 1 to 20 single fuel cell voltage data. ADC converter modules sized to scan 16 single fuel cell voltage data each may be used.

This arrangement allows for a less strict tolerance as concerns the distance between pins with respect to the case where a single CVM is used for all fuel cells at once.

An arrangement where each module acquires a number of voltage data equal to a power of two favours data elaboration on part of the software. The maximum voltage for each module is less than 16 V hence the CVM components are protected in view of the generally low isolation voltage of standard electronic components.

The electric connection between each single fuel cell and the monitoring device 39 is ensured by a system of metallic contacts and springs. Prior to installation, all such contacts and springs undergo a surface treatment to prevent oxidation phenomena which could potentially cause false electric contacts.

The time required by the monitoring device 39 to collect the voltage of a single fuel cell is about 1 ms.

The monitoring device 39 is provided with a processor (not shown) that is programmable to perform mathematical operations in order to calculate the minimum fuel cell voltage, the maximum fuel cell voltage, the average fuel cell voltage and the standard deviation of the single fuel cell voltages. These information, fundamental for the efficient management of the back-up power system, are passed to the control system. Each module of cell voltage monitoring device 39 is capable of scanning all voltage data relative to the fuel cells connected thereto and of performing the corresponding mathematical operations needed for its management and control in around 50 ms.

The electric user 8 can be fed selectively or simultaneously by the stack 5 and by an auxiliary source consisting of e.g. batteries 60 of a known type or, as an alternative, by capacitors dischargeable in a controlled manner, through activation of the means of switching or power conditioning, which come thus to represent means for commanding the withdrawal of electric power by the electric user from the stack and/or the auxiliary source of electric power.

The power conditioning unit 22 comprises two distinct modules working together:
- a DC/DC module 40 adapted to stabilise the stack voltage at a given value suitable for electric user 8 (e.g. 48 V for back-up applications in the telecommunication field);
- a DC/AC module 41 which acts as an inverter with line interactive UPS function (class 1).

Therefore, the DC/DC module 40 of the power conditioning unit 22 has a symmetric architecture and it is able to work according to a plurality of operation modes, defined as follows:
- Output voltage stabilization mode: during constant and continuative generation of electric power, the output voltage is kept constant by the power conditioning unit 22, whatever the current needed by the electric user is;
- Input current stabilization mode: this configuration is applied during the start-up phase (during less than 30 seconds) in order to not overload the stack;
- Auxiliary energy source input current stabilization mode: this configuration is applied when the auxiliary energy source undergoes a deep discharge and it is necessary to limit the input current to the maximum input current value suitable for the auxiliary energy source.

The DC/DC module 40 has the peculiarity of a larger incoming voltage range. A standard DC/DC module generally works at 48 V±20%, whereas the DC/DC module 40 is designed so as to be compatible with a voltage range comprised between 37 V and 65 V.

The DC/AC module 41 also is designed to be capable of working in three different operational modes:
- voltage generation: when the generator is working as island generator and UPS
- grid connected current generation
- battery charger rectification: when the black-out ends and the auxiliary source, which has been discharged during the generator start-up, has to be recharged.

In the following, different operation phases of the electric generator 1 will be described in detail.

1. Start-up
1.1 Leakage Test

Back-up fuel-cell-based electric generators employ explosive gases, therefore it is crucial that any leakage be avoided.

Figure 6:
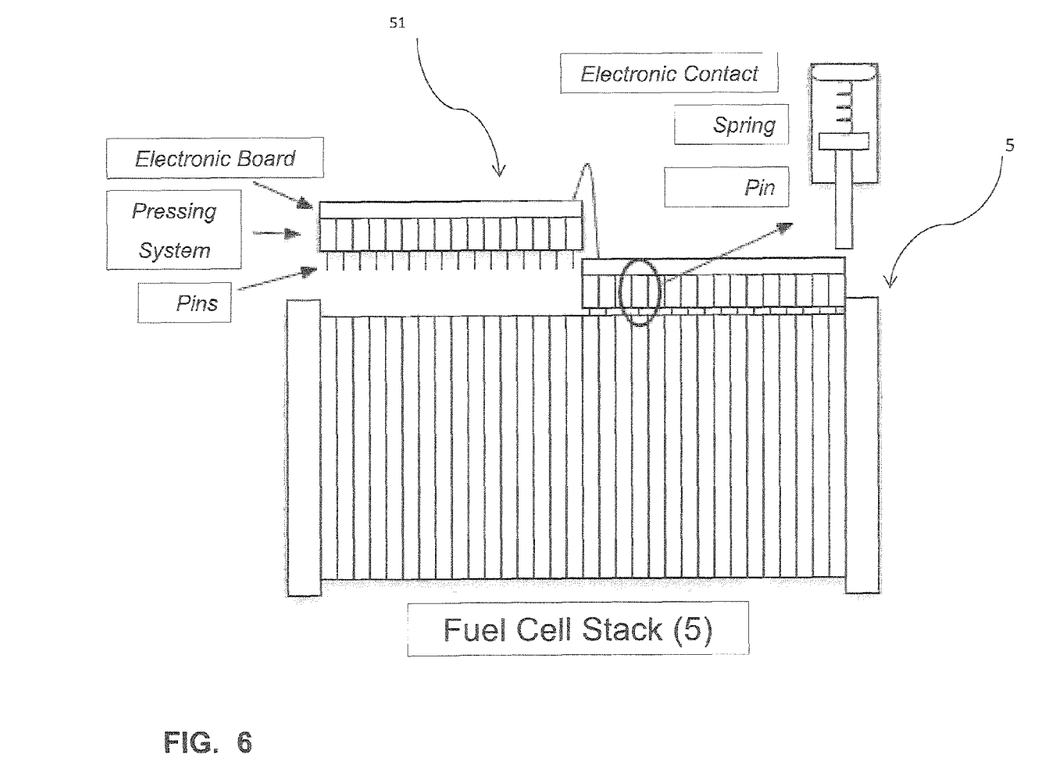
FIG. 6 is a side view of the stack and the monitoring device thereof of a fuel cell electric generator according to an embodiment of the invention.

To this end, a leakage test procedure (FIG. 6) is implemented which basically involves measuring a pressure value over a predetermined time period (thereby evaluating a pressure gradient) by means of a plurality of pressure sensors 42 located within the manifold body and in direct communication with the conduits, having previously closed inlet valves 3 and purging valves 6 and 7.

If no leakages are present in the system, the pressure inside the anode and cathode circuits shall gradually decrease in a know manner down to atmospheric pressure (reference pressure gradient).

The leakage test procedure is therefore carried out by introducing (FIG. 6, block 202) the respective gases in the anode and cathode circuits, whilst closing (block 203) inlet and purging valves as described above, and acquiring pressure value data (blocks 204) over the set time period $t_0$ (block 205). After the set time period $t_0$, pressure is acquired again (block 206). If (decision block 207) the average pressure gradient calculated based on the data acquired (and basically evaluated as $\Delta P$, i.e. the overall pressure variation over the time period $t_0$) is equal or greater than the reference gradient, the leakage test procedure returns (block 209) a value associated with the absence of leakages in the system and it is possible to proceed on with the start-up procedure. If, opposite, this comparison shows that there are leakages in the system, the generator operation is interrupted and technical intervention is required (block 208).

Figure 7:
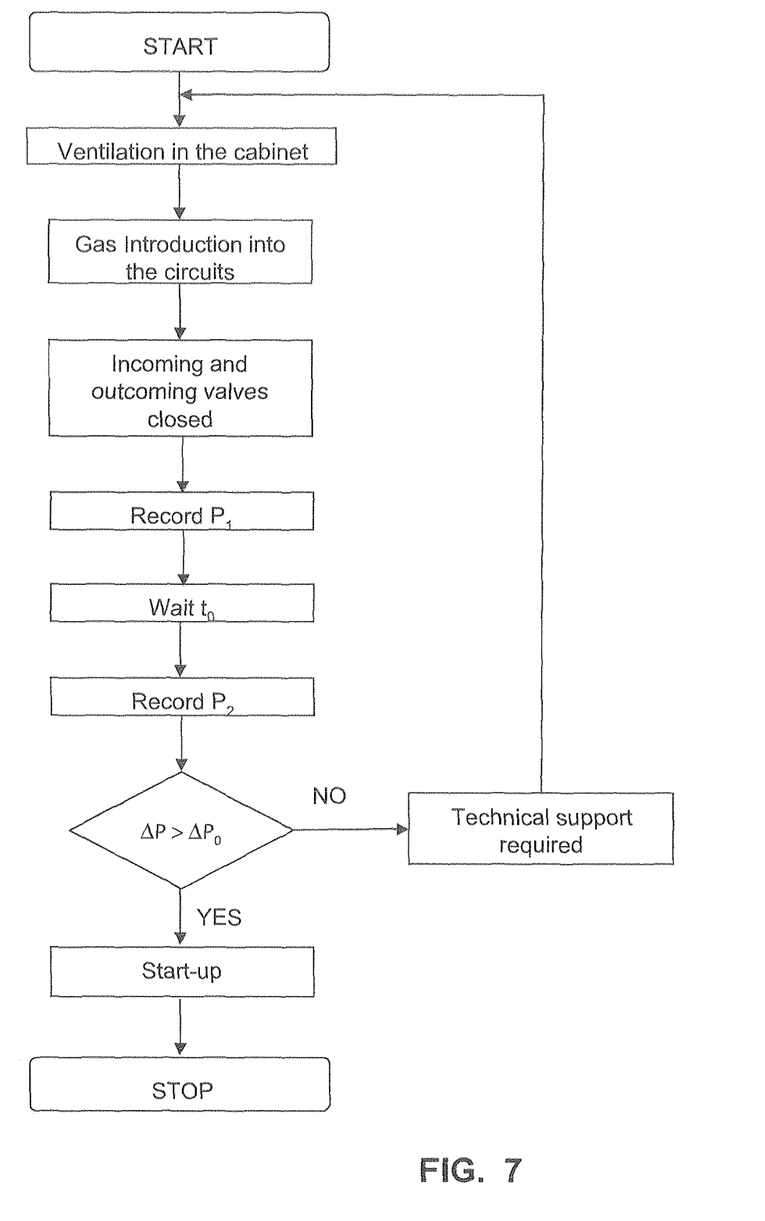
FIG. 7 is a flow chart that illustrates details of the leakage test procedure according to an embodiment of the invention.

This leak test procedure is part of the start-up procedure of electric generator 1, which will now be described in greater detail with reference to FIG. 7. Since a short start-up time is one of the main goals of a back-up system, the pressure is monitored for a relatively short time (e.g. 10 seconds) so that the possible presence of large leakages is precluded without introducing too great a delay.

According to an embodiment of the invention, the very same leakage test procedure is also performed—as will be further described below—as part of the shut-down procedure. At that stage, the pressure is monitored for as long as 60 seconds so that even the presence of very small leakages may be detected. Accordingly, even the absence of minor leakages may be ascertained. While verifying the absence of major leakages during the start-up phase aims at ensuring that the generator may operate, promptly and shortly thereafter, as a back-up source of electric power for the user, repeating an even more accurate control upon shutting down the generator has the advantage of verifying that it will be ready to be safely and efficiently operated when the next power outage occurs.

1.2 "Smart" Start-Up Management

The maximum stack output power depends upon several factors such as stack temperature, reagent mixture degree of humidification, presence of water in the liquid state inside the stack and so on. During the normal continuous operation, the system is adapted to control these parameters so that the optimal conditions for running the stack are ensured. Yet, in back-up applications, it is not possible to forecast the generator start-up conditions, yet the generator is expected to be able to start-up under any temperature and humidification condition within as a short a time period as possible without causing the system damages, neither in the short nor in the long term.

In order to do this, the system described herein follows a start-up procedure based on which the demand of power from the stack is adjusted, instant by instant, at approximately the maximum value compatible, at that time and under those conditions, with its safe and correct operation and with the avoidance of structural damages in the fuel cells. In fact, should the stack incorrectly be required to provide a power greater than the instant maximum compatible value, the generator might, somehow, be able to comply with the request, yet this would very likely cause a local overheating in one or more fuel cells (i.e. occurrence of "hot spots"), which may damage proton-exchange membranes irreparably. This localised temperature increase occurs when a fuel cell reacts to the excessive request of power by supplying a current close to a maximum value, hence the voltage thereof is dramatically reduced, possibly to the point of becoming null or even negative.

As a consequence, the efficiency and reliability of the back-up generator might be irreparably compromised and at the next power outage it might fail to intervene at all.

Figure 8:
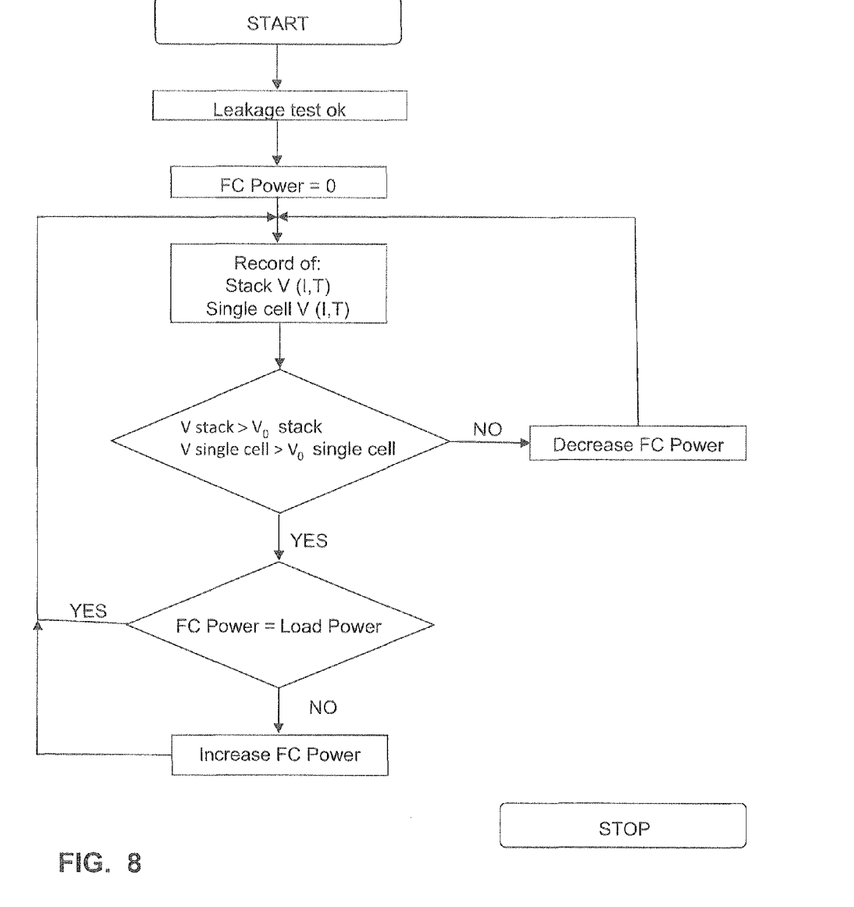
FIG. 8 is a flow chart that illustrates details of the method for starting up the fuel cell electric generator according to an embodiment of the invention.

According to the start-up method, as outlined in the flow chart of FIG. 8, once the leakage test procedure described above has been completed (block 101), data relative to overall stack voltage and individual cell voltage of each single cell in the stack are continuously acquired (103) and compared (decision block 104) with respective reference values $V_{O,S}$ and $V_{O,SC}$ stored in a memory unit (not shown). A detail of the comparison is provided by way of example, in FIG. 9, where the reference values of normalised voltage are plotted against normalised current and compared with corresponding values measured on the system (characteristic curve).

Figure 9:
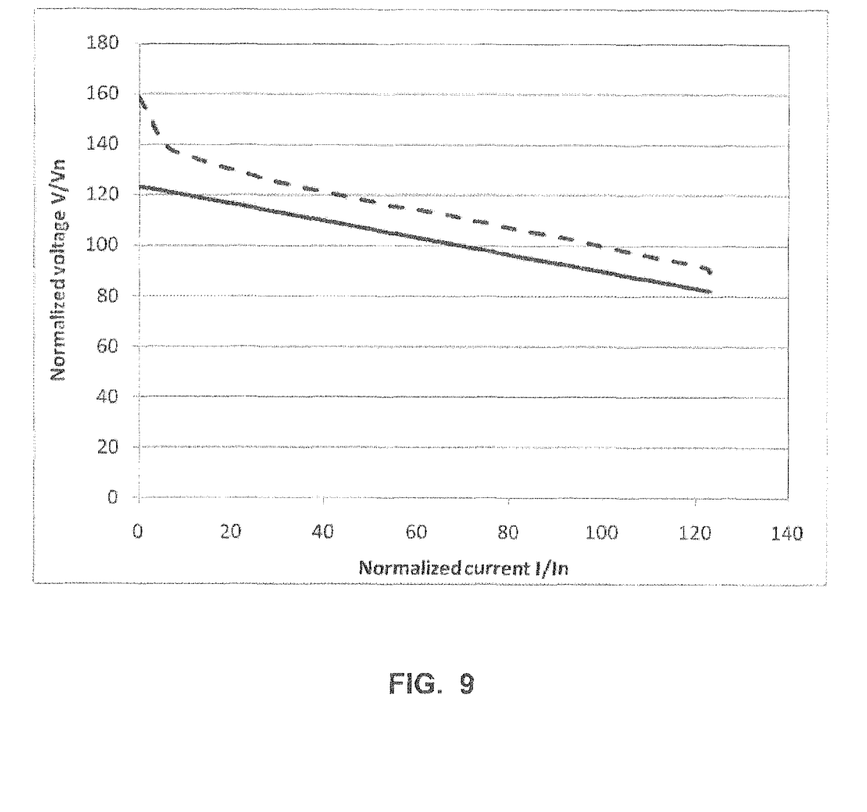
FIG. 9 is a qualitative graph wherein reference values (continuous line) of fuel cell normalised voltage are plotted against normalised current and compared with corresponding values directly measured on the generator (characteristic curve, dotted line)

The reference values of normalised voltage as a function of normalised current which are plotted as the reference curve in FIG. 9 are purposely selected based on data acquired during operation of the stack under nominal conditions (e.g. temperature=60-65° C., humidity 90-100%) with a view to ensuring the proper generator operation. The control system is programmed so as to tolerate a predetermined percentage deviation (PPD) from the respective reference values $V_{O,S}$ and $V_{O,SC}$ for overall stack voltage $V_S$ and average single cell voltage $V_{SC}$. In order to minimise the time needed to achieve the nominal working current of the stack (set at 180 A), the PDD may be set at 15% for $V_S$ and at 20% for $V_{SC}$.

If, accounting for the PPD, the actual working point of the stack is below the corresponding reference value, the request of power off the fuel cells is decreased (block 105), whereas if the working point of the stack is above the reference value, the request of power off the fuel cells will be increased (107) previous checking whether (decision block 106) the power off the fuel cells is equal to that required by the electric user 8. As long as this condition is not verified, the power requested off the fuel cells is increased; when this condition is finally verified, the start-up procedure is successfully ended. Until the stack eventually reaches full power (block 108), the auxiliary energy sources supply the extra power needed to ensure that the power requirements of user 8 are fully met.

Upon completion of the start-up procedure, once the whole of the user power request is eventually being supplied by the fuel cell stack alone, the stack may be requested to supply a supplementary amount of power which is used to recharge the auxiliary power sources, i.e. batteries or capacitors, so that they, too, are going to be fully charged and ready for use when circumstances requiring the intervention of the back-up generator arise again.

2. Management During Operation 2.1 Method for Recovering a Flooded Fuel Cell Stack The monitoring device 39 monitors the performance of each single cell in the stack 5 by acquiring a plurality of data relative to voltage, temperature, humidity, and calculates, on the basis of those data, the minimum cell voltage and the single cell voltage distribution. Further, on the basis of these information items, monitoring device 39 adjusts the speed of pumps 9 and 10 on the respective recirculation circuits.

If the single cell voltage of one cell is found to be less than a threshold value $TV_O$ calculated as a predetermined percentage of the average of all single cell voltages (e.g. 80% of the average value), it is likely that flooding of that single fuel cell has occurred.

When such eventuality occurs, the control system increases, in response, the oxygen and hydrogen flows by setting the recirculation pumps at maximum rate so that the local pressure in the reagent circuits increases and the cause of obstruction, if present, is thereby mechanically removed. If the behaviour of that single fuel cell does not improve in consequence to such adjustment, a method for recovering a flooded fuel cell is applied, which will be described in the following.

When the voltage cell monitoring device detects a decrease in a single fuel cell voltage, as described above, the control system initiates a procedure for the recovery thereof.

The fuel cell recovery procedure comprises the step of increasing the pressure inside the inner channels of the fuel cells of stack 5 by closing valve means 14 and 15 in branches A and C, respectively, for a very short fraction of time (e.g. less than 1 second).

If the recovery method is implemented on one single circuit (anode or cathode) the valve means (14 or 15, depending on which circuit is involved) are opened when the differential pressure reaches a predetermined maximum value, in order to avoid the membrane rupture. Such predetermined maximum value may be set at 500 mbar, preferably 400 mbar.

When the cell voltage falls below a first predetermined value, e.g. 450 mV, the stack is temporarily disconnected from the user, which is then served, until the connection to the stack is re-established, by alternative power sources, such as batteries. If the cell voltage falls below a second predetermined value, lower than the first predetermined value, (e.g. 300 mV) an alarm signal is outputted and operation of the generator is interrupted.

2.2 Stack Temperature Control

The electric generator 1 comprises a control system (not shown) adapted to control the temperature of the fuel cell stack by varying the angular velocity of fans 20. The angular velocity of the fans is increased or decreased as a function of the difference between the measured fuel cell stack temperature and a temperature reference value $T_{ref}$. To this end, a plurality of temperature sensors are located in the manifold body.

3. Shut-Down

As explained above, the presence of liquid water in a fuel cell may cause severe damage to the fuel cell itself, thereby inducing a decrease in the overall efficiency of the back-up generator. In that respect, one of the most critical steps is the shut-down of the back-up generator, because temperature in the system decreases, gases no longer flow into the stack fuel cells and steam may condensate in the stack, thus occluding the flow field channels within the fuel cells, i.e. the channels along which reagents and products flow inside the fuel cells of stack 5.

Figure 10:
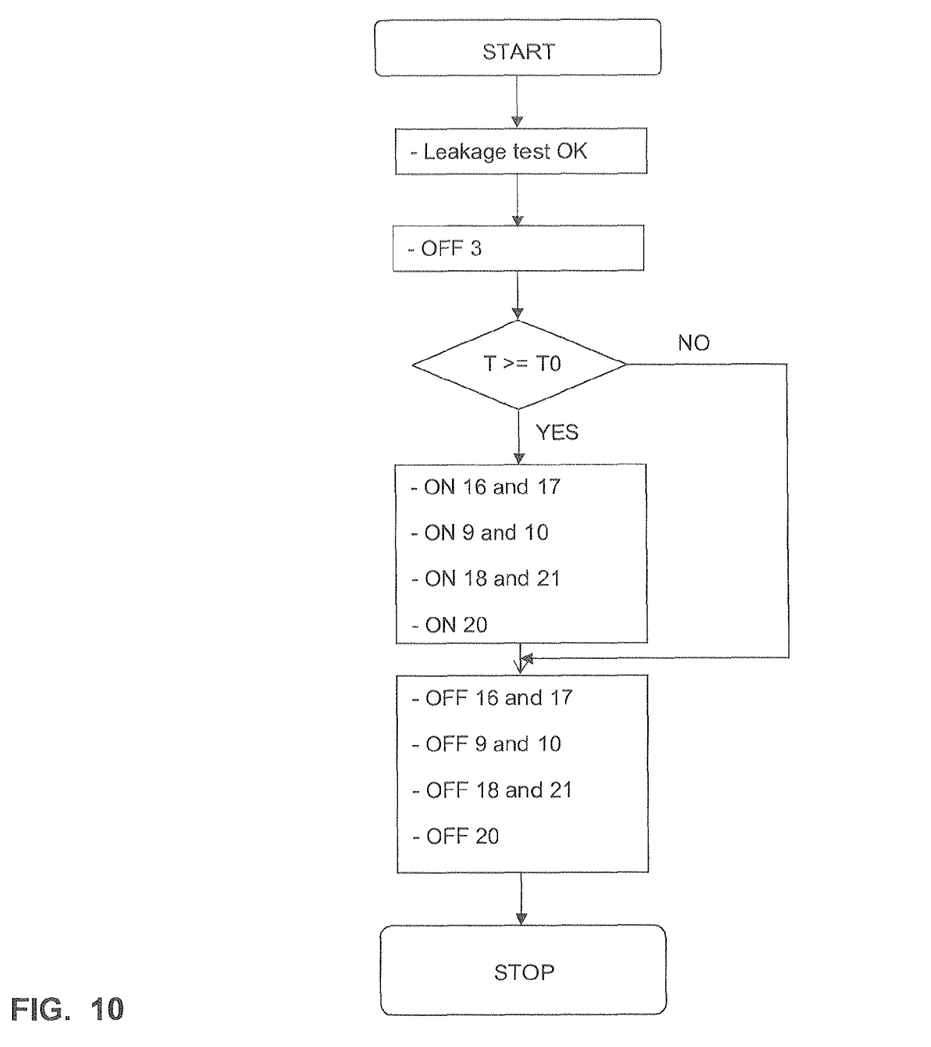
FIG. 10 is a flow chart that illustrates details of the method for shutting down the fuel cell electric generator according to an embodiment of the invention.

In order to prevent this undesired scenario, the following shut down procedure, which will be described below with reference to FIG. 10, is implemented.

Once the prolonged leakage test procedure described above has been successfully completed (block 301), the flow of incoming gases is interrupted by switching (block 302) valve means 3 to a respective "close" position. Fresh reagents are no longer fed to the generator, hence only the gases which were inside the stack at the switching time remain to be consumed. Since the user is no longer electrically connected to generator 1, to consume the gases still inside the stack at the switching time there is provided an electric resistance, which, under normal operating conditions, is not electrically connected to the stack, whereas in this circumstance it is. Moreover, recirculation pumps 9 and 10 stay switched on, in order to favour the purging of water through the purge valve means 16 and 17, that are kept open.

If (decision block 303) the temperature of stack 5, which is measured by means of a probe positioned within the manifold body 27, is greater than a predetermined set value $T_0$, the pumps of the coolant loops (18 and 21) and the radiator fan 20 are switched on. They stay on as long as temperature decreases, until (decision block 305) the predetermined set value $T_0$ is reached.

The value of $T_0$ may vary, depending upon environment conditions, but it is usually between 20° C. and 35° C. Preferably, $T_0$ is set at 27° C.

When the predetermined set temperature value is reached, as shown at block 306, purge valve means 16 and 17 are closed and recirculation pumps 9 and 10, along with the pumps of the coolant loop (18 and 21) and the radiator fan (22), are switched off.

Thus a method for shutting down a back-up fuel cell electric generator comprising a step of simultaneously cooling down the system and purging out water by intensifying the circulation of gaseous flows (pumps 9 and 10 are kept switched on) to favour the displacement of water towards the drainers (purge valve means 16 and 17), which are also kept open, while at the same time also maintaining the flow of the first and second coolant fluids in their respective conduits (pumps 18 and 21 are kept switched on). Thus, the system maximises the removal of water before it may even condense, since the whole operation is performed continuously as long as temperature remains above a set value safely above water condensation point.

This procedure advantageously preserves the conduits free from water, thus ensuring that, at the next power outage, the eventuality of flooding is excluded and fresh gaseous reagents will be able to flow along completely free passageways.

Stand-By Check

Back-up applications are characterized by a very high reliability and by an operation time which is short compared with the stand-by time. As a consequence, in order to check the reliability of the generator, the control system performs self-diagnostic tests with a pre-set periodicity (e.g. every week, every month or every six months). Three kinds of test are implemented:

auxiliary test: each auxiliary component (pumps, fans, electronic valves, etc.) is selectively switched on and the performance thereof is checked by sensors located on the manifold body.

fuel cell stack test: during this test the minimum power is required off the fuel cell stack and both the correct start-up and single cell performances are checked by the control system generator test: a power outage is simulated so that the generator has to switch on. The outage lasts for the time period needed by the stack to reach the nominal conditions.

If any of these tests fails, technical support is required.

Figure 2:
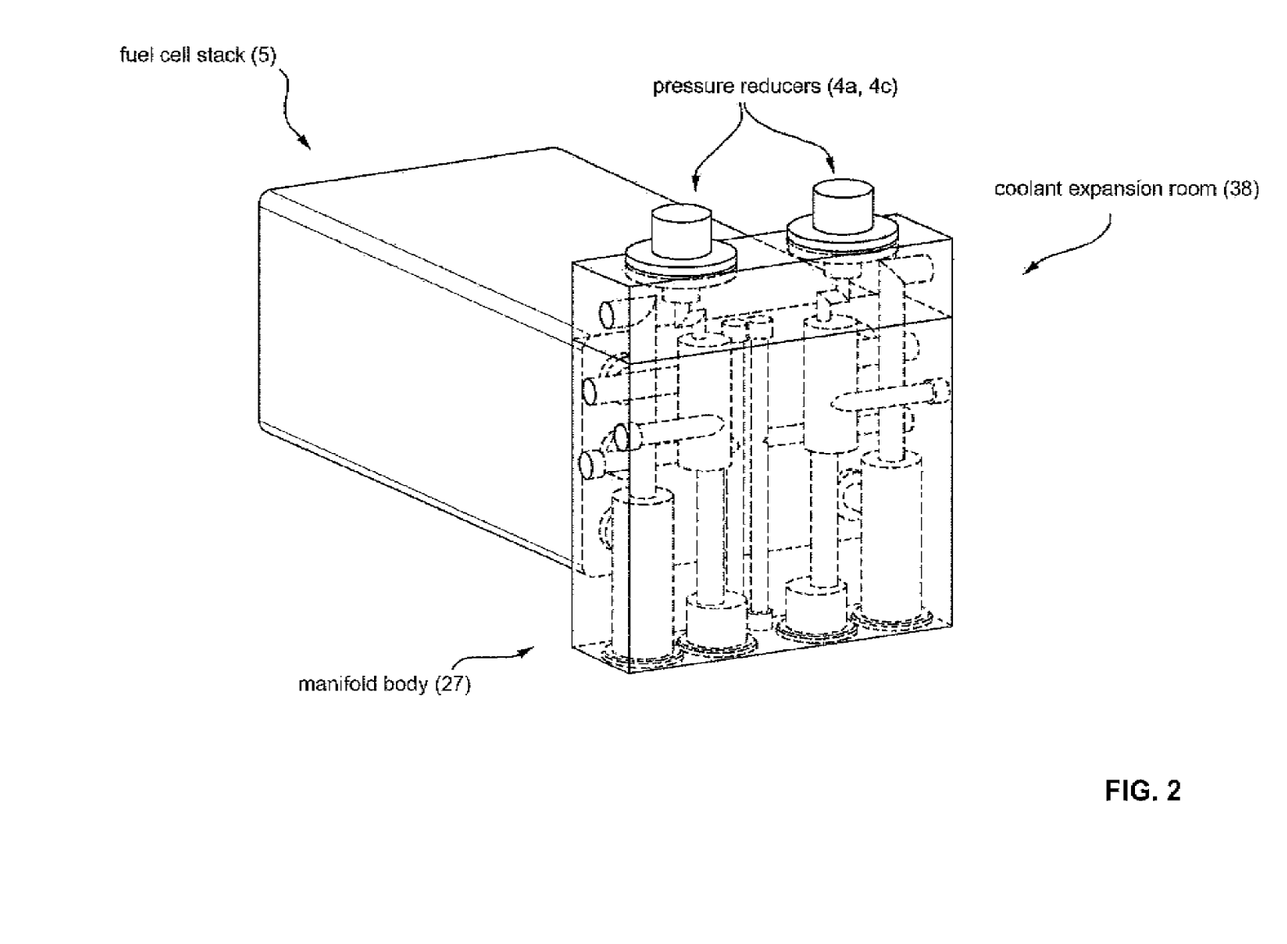
FIG. 2 illustrates a simplified perspective view of the ensemble of piping and conduits for incoming and outgoing fluids connected to the electrochemical conversion module of a fuel cell electric generator via a manifold body, according to an embodiment of the present invention.

The electric generator according to the present invention has a number of advantages with respect to solutions known in the art, in that, in particular, overall size and weight of the system are significantly reduced: not only does the generator not comprise cumbersome auxiliary devices such as blowers or ad-hoc humidification devices but also, power and efficiency of the generator being equal, the geometry and functionality of the manifold body described herein are such to further reduce the bulkiness of the generator. A direct comparison of a generator according to the invention with a known generator may be done based on the drawings of FIGS. 1 and 2.

As a result of both structure and functions of the manifold body as described herein, a greater simplicity of manufacture, management and maintenance of the system are achieved; further, start-up times are reduced.

The invention claimed is:

1. A method of starting up a fuel cell electric generator to satisfy a power request of a user (UPR), comprising the steps of:
   (a) supplying said user with an auxiliary power supply (APS) and, in parallel, with a fuel cell power supply (FCP) being obtained from the fuel cells in such a manner that the sum of them is substantially equal to said user power request (UPR);
   (b) acquiring data relative to:
      overall stack voltage ($V_S$);
      individual cell voltage ($V_{SC}$) of each single cell in the stack;
      overall stack voltage ($V_S$) as function of current (I) and individual cell voltage ($V_{SC}$) as function of current (I);
   (c) progressively increasing said fuel cell power supply (FCP) and decreasing said auxiliary power supply (APS) such that their sum remains substantially equal to said user power request (UPR); wherein said step (c) of progressively increasing said fuel cell power supply (FCP) is carried out only if said acquired data are detected to be greater than respective reference values of normalized voltage ($V_{O,SC}$ and $V_{O,SC}$) as a function of normalized current, stored in a memory unit; and only until said fuel cell power supply (FCP) is detected to be equal to said user power request (UPR).

2. The method of claim 1, wherein when said acquired data are detected to be less than respective reference values $V_{O,SC}$ and $V_{O,SC}$ stored in a memory unit, said fuel cell power supply (FCP) is decreased and said auxiliary power supply (APS) is accordingly increased.

3. The method of claim 2 wherein said reference values $V_{O,SC}$ and $V_{O,SC}$ stored in said memory unit correspond to stack operating conditions preventing the local superheating and/or flooding of the fuel cells.

* * * * *